(12) United States Patent
Gerges et al.

(10) Patent No.: US 10,706,721 B2
(45) Date of Patent: Jul. 7, 2020

(54) TOLL ROAD DETECTION AND REPORTING SYSTEM

(71) Applicant: DENSO International America, Inc., Southfield, MI (US)

(72) Inventors: Markos Gerges, Southfield, MI (US); Miki Sato, Novi, MI (US); Ting-Yu Lai, Southfield, MI (US)

(73) Assignee: DENSO International America, Inc., Southfield, MI (US)

(*) Notice: Subject to any disclaimer, the term of this patent is extended or adjusted under 35 U.S.C. 154(b) by 181 days.

(21) Appl. No.: 16/040,608

(22) Filed: Jul. 20, 2018

(65) Prior Publication Data

US 2020/0027344 A1    Jan. 23, 2020

(51) Int. Cl.
| | | |
|---|---|---|
| G06K 9/00 | (2006.01) |
| G08G 1/0967 | (2006.01) |
| G06K 9/32 | (2006.01) |
| G08G 1/0962 | (2006.01) |
| G07B 15/04 | (2006.01) |

(52) U.S. Cl.
CPC ..... *G08G 1/09623* (2013.01); *G06K 9/00818* (2013.01); *G06K 9/3258* (2013.01); *G07B 15/04* (2013.01); *G08G 1/0967* (2013.01)

(58) Field of Classification Search
None
See application file for complete search history.

(56) References Cited

U.S. PATENT DOCUMENTS

| | | | | |
|---|---|---|---|---|
| 7,986,812 | B2* | 7/2011 | Furusawa | G06K 9/2054 |
| | | | | 348/208.99 |
| 8,194,927 | B2* | 6/2012 | Zhang | G06K 9/00798 |
| | | | | 382/104 |
| 8,229,171 | B2* | 7/2012 | Takahashi | G06K 9/00771 |
| | | | | 382/104 |
| 8,379,923 | B2* | 2/2013 | Ishikawa | G01C 21/32 |
| | | | | 382/104 |
| 8,587,454 | B1* | 11/2013 | Dearworth | G07B 15/063 |
| | | | | 340/5.1 |
| 10,074,219 | B2* | 9/2018 | Wilson | G07B 15/063 |
| 2010/0274469 | A1* | 10/2010 | Takahata | G06F 16/29 |
| | | | | 701/532 |
| 2011/0161140 | A1* | 6/2011 | Polt | G07B 15/063 |
| | | | | 705/13 |
| 2020/0027344 | A1* | 1/2020 | Gerges | G08G 1/09623 |

* cited by examiner

*Primary Examiner* — Tahmina N Ansari
(74) *Attorney, Agent, or Firm* — Harness, Dickey & Pierce, P.L.C.

(57) ABSTRACT

A toll road detection and notification system for a vehicle includes a plurality of cameras, a sign recognition unit, and a driver alert system. The plurality of cameras is configured to take images of a vehicle's environment. The sign recognition unit is configured to analyze the images from the plurality of cameras, detect a toll sign, and determine toll information. The driver alert system is configured to receive toll information from the sign recognition unit and notify a driver of the vehicle of the toll information.

18 Claims, 12 Drawing Sheets

TOLL ROAD DETECTION AND REPORTING SYSTEM

FIELD

The present disclosure relates to a toll road detection and reporting system, and, more particularly, to a vehicle system for detecting toll booths and reporting associated information such as costs.

BACKGROUND

This section provides background information related to the present disclosure which is not necessarily prior art.

Many vehicles currently employ cameras used for the vehicle's own benefits. The cameras and/or proximity sensors provide information to the vehicle's control system regarding the events and environment surrounding the vehicle. The vehicle then may use this information in executing its own systems and functions, such as automatic emergency brake, forward collision warning, lane departure warning, lane change assist, etc.

SUMMARY

This section provides a general summary of the disclosure, and is not a comprehensive disclosure of its full scope or all of its features.

An example toll road detection and notification system for a vehicle according to the present disclosure includes a plurality of cameras, a sign recognition unit, and a driver alert system. The plurality of cameras is configured to take images of a vehicle's environment. The sign recognition unit is configured to analyze the images from the plurality of cameras, detect a toll sign, and determine toll information. The driver alert system is configured to receive toll information from the sign recognition unit and notify a driver of the vehicle of the toll information.

The sign recognition unit may be configured to use data recognition or image comparison to detect a toll cost from images or words printed on the toll sign.

The toll road detection and notification system may further include a vehicle position determination unit configured to determine a location of the vehicle. The sign recognition unit may be configured to receive the location of the vehicle and determine a toll booth location. The sign recognition unit may also be configured to search the internet to determine a toll cost from the toll booth location.

The vehicle position determination unit may be configured to determine the location of the vehicle by communicating with a global positioning system.

The vehicle position determination unit may be configured to determine the location of the vehicle using an odometer reading.

The sign recognition unit may be configured to use data recognition or image comparison to detect a toll booth location from images or words printed on the toll sign. The sign recognition unit may also be configured to search the internet to determine a toll cost from the toll booth location.

The driver alert system may be configured to notify the driver using an audible alert through at least one speaker on the vehicle.

The driver alert system may be configured to notify the driver using a visual alert on a heads-up display on the vehicle.

The sign recognition unit may be configured to detect lane information using data recognition or image comparison from images or words on the toll sign. The driver alert system may be configured to notify the driver of the lane information.

A method of detecting and reporting a toll road according to the present disclosure includes capturing, by a plurality of cameras, at least one image of an environment of a vehicle on which the plurality of cameras are mounted; analyzing, by a sign recognition unit, the at least one image from the plurality of cameras; detecting, by the sign recognition unit, a toll sign from the at least one image; determining, by the sign recognition unit, toll information; receiving, by a driver alert system, toll information from the sign recognition unit; and notifying, by the driver alert system, a driver of the vehicle of the toll information.

The method may further include detecting, by the sign recognition unit, a toll cost from images or words printed on the toll sign using data recognition or image comparison.

The method may further include determining, by a vehicle position determination unit, a location of the vehicle; receiving, by the sign recognition unit, the location of the vehicle; determining, by the sign recognition unit, a toll booth location from the location of the vehicle; and searching, by the sign recognition unit, the internet to determine a toll cost from the toll booth location.

The method may further include communicating, by the vehicle position determination unit, with a global positioning system to determine the location of the vehicle.

The method may further include determining, by the vehicle position determination unit, the location of the vehicle using an odometer reading.

The method may further include implementing, by the sign recognition unit, data recognition or image comparison to detect a toll booth location from images or words printed on the toll sign; and searching, by the sign recognition unit, the internet to determine a toll cost from the toll booth location.

The method may further include sending, by the driver alert system, an audible alert through at least one speaker on the vehicle to notify the driver.

The method may further include sending, by the driver alert system, a visual alert on a heads-up display on the vehicle to notify the driver.

The method may further include detecting, by the sign recognition unit, lane information using data recognition or image comparison from images or words on the toll sign; and notifying, by the driver alert system, the driver of the lane information.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Vehicles are often equipped with various sensors (for example, cameras, lidars, radars, microphones, etc.) to support safety and navigation features on the vehicle. The present disclosure uses the cameras on the vehicle to automatically detect toll signs and report toll information to the driver. For example, the information may include cost, lane information, etc. In some cases, the information may not be provided on the sign, and the system may utilize the internet, GPS, or stored data to determine the toll information.

Figure 1:
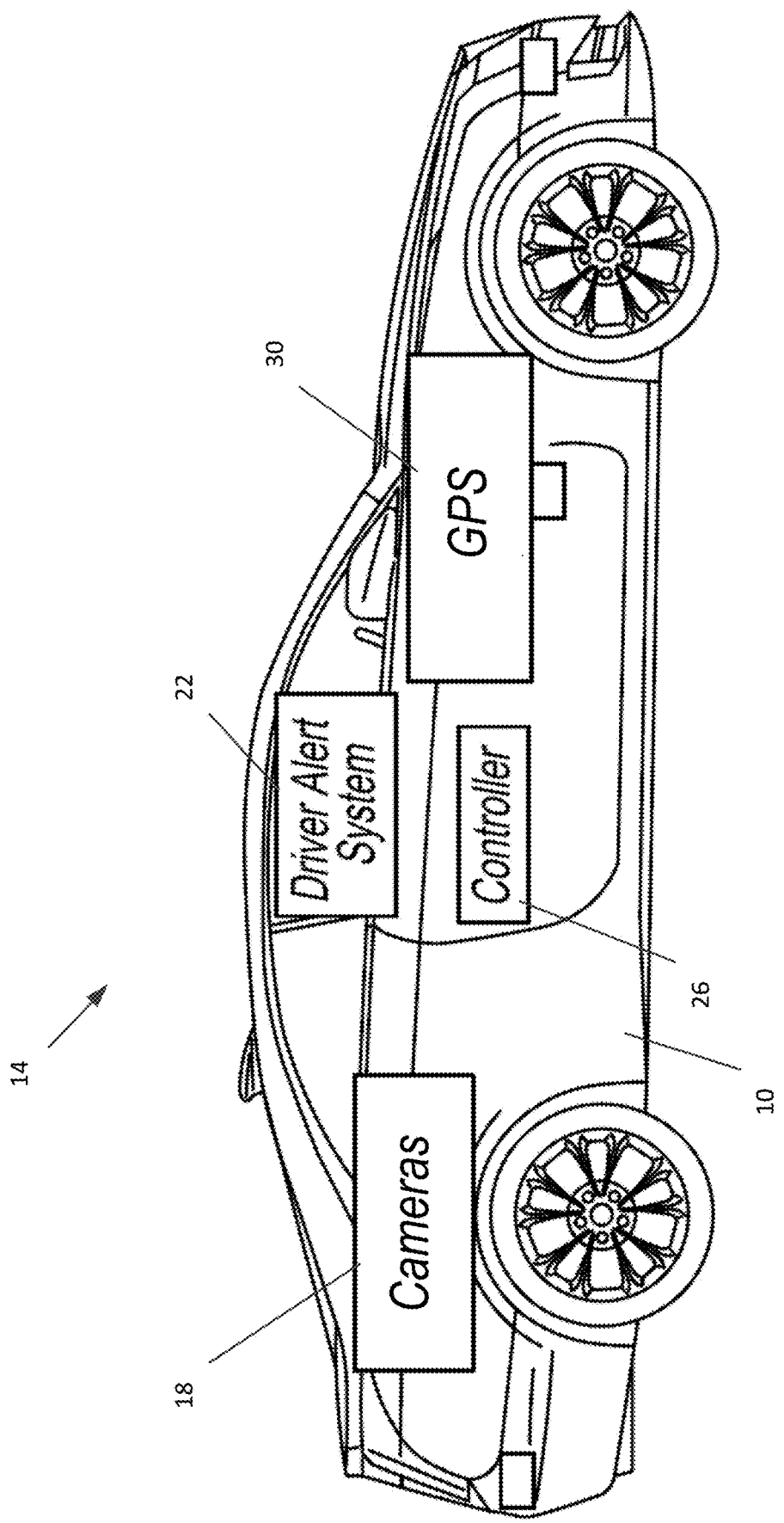
FIG. 1 is a vehicle including a toll road detection and reporting system according to the present disclosure.

With reference to FIG. 1, a vehicle 10 including a toll road detection and reporting system 14 according to the present teachings is illustrated. Although the vehicle 10 is illustrated as an automobile in FIG. 1, the present teachings apply to any other suitable vehicle, such as a sport utility vehicle (SUV), a mass transit vehicle (such as a bus), or a military vehicle, as examples. The system 14 is configured to automatically detect toll signs and report toll information to the driver. The system 14 may generally include one or more cameras 18, a driver alert system 22, a controller 26, and a global positioning system (GPS) or global navigation satellite system (GNSS) 30.

The controller 26 can be any suitable controller for monitoring and/or controlling one or more of the cameras 18, the driver alert system 22, the GPS/GNSS 30, and/or the additional vehicle systems, sensors, and functions. In this application, including the definitions below, the terms "controller" and "system" may refer to, be part of, or include processor hardware (shared, dedicated, or group) that executes code and memory hardware (shared, dedicated, or group) that stores code executed by the processor hardware. The code is configured to provide the features of the controller and systems described herein.

The one or more cameras 18 include one or more cameras configured to identify and/or detect the presence of objects, such as pedestrians, cyclists, other vehicles, traffic signs, or toll signs in one or more areas around the subject vehicle 10. The cameras 18 can include any suitable camera for detecting objects in an area around the subject vehicle 10 (for example only, audio, video, lidar, radar, etc.). The cameras 18 can be mounted at any suitable position on the subject vehicle 10, such as, for example, in the front of the subject vehicle 10, near the front corners of the subject vehicle 10, on the roof of the subject vehicle 10, or along the sides of the subject vehicle 10.

Figure 2:
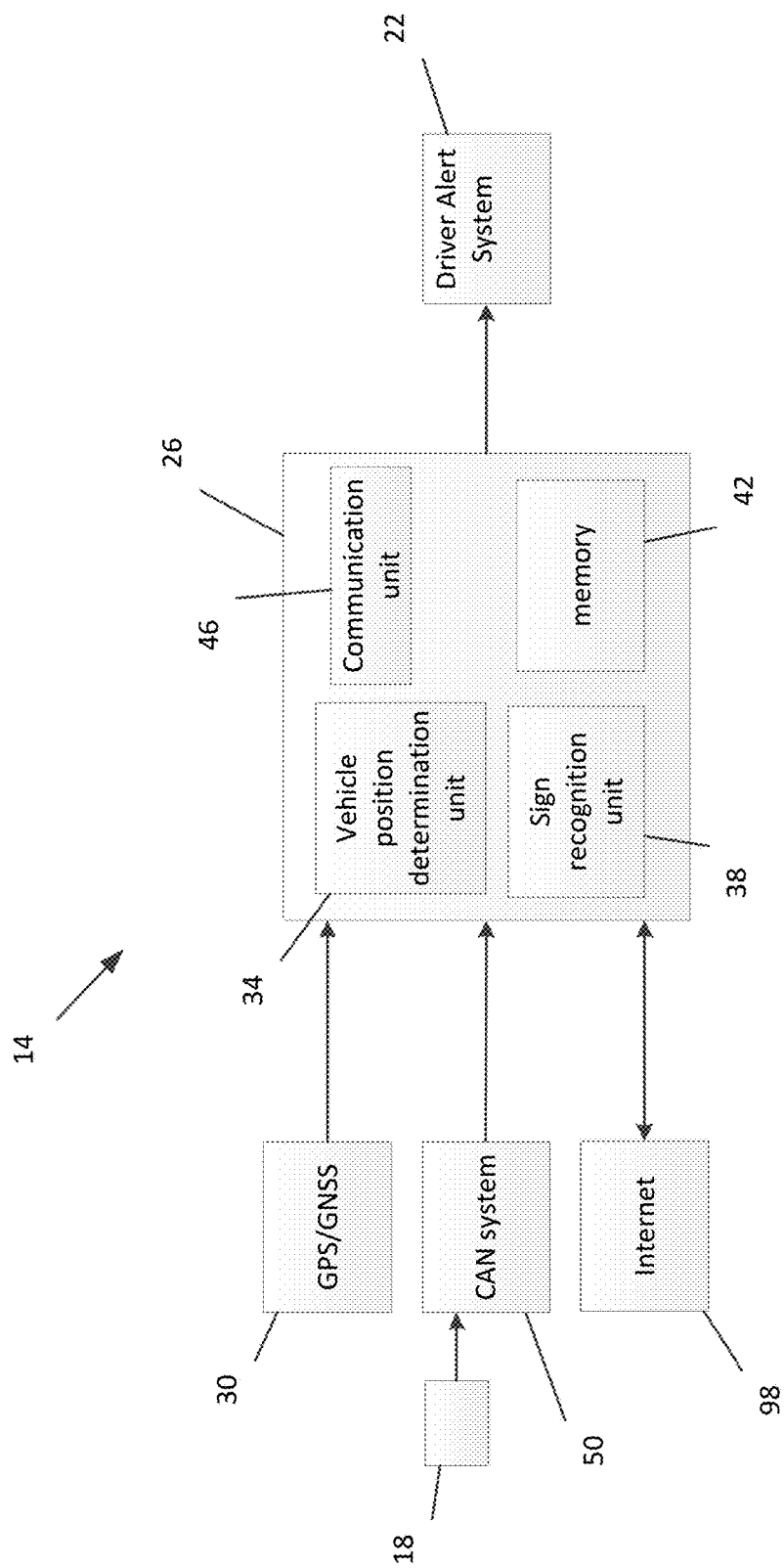
FIG. 2 is a schematic view of the toll road detection and reporting system according to the present disclosure.

Now referring to FIG. 2, the system 14 is configured to automatically detect toll signs and report toll information to the driver. The controller 26 may include a vehicle position determination unit 34, sign recognition unit 38, a memory 42, and a communication unit 46. The vehicle position determination unit 34 may communicate with, and receive signals from, the GPS and/or GNSS 30 and/or the cameras 18 to determine a location of the vehicle 10. The cameras 18 may communicate with the vehicle position determination unit 34 through a Controller Area Network (CAN) system 50 or any other vehicle communication system.

The sign recognition unit 38 may receive signals from the cameras 18. The sign recognition unit 38 may use the cameras 18 to detect toll signs. The sign recognition unit 38 may also determine toll information from the images using data recognition. For example, the sign recognition unit 38 may compare known toll images, words, or letters to detect and decipher the information provided in the images from the cameras 18.

Figure 4A:
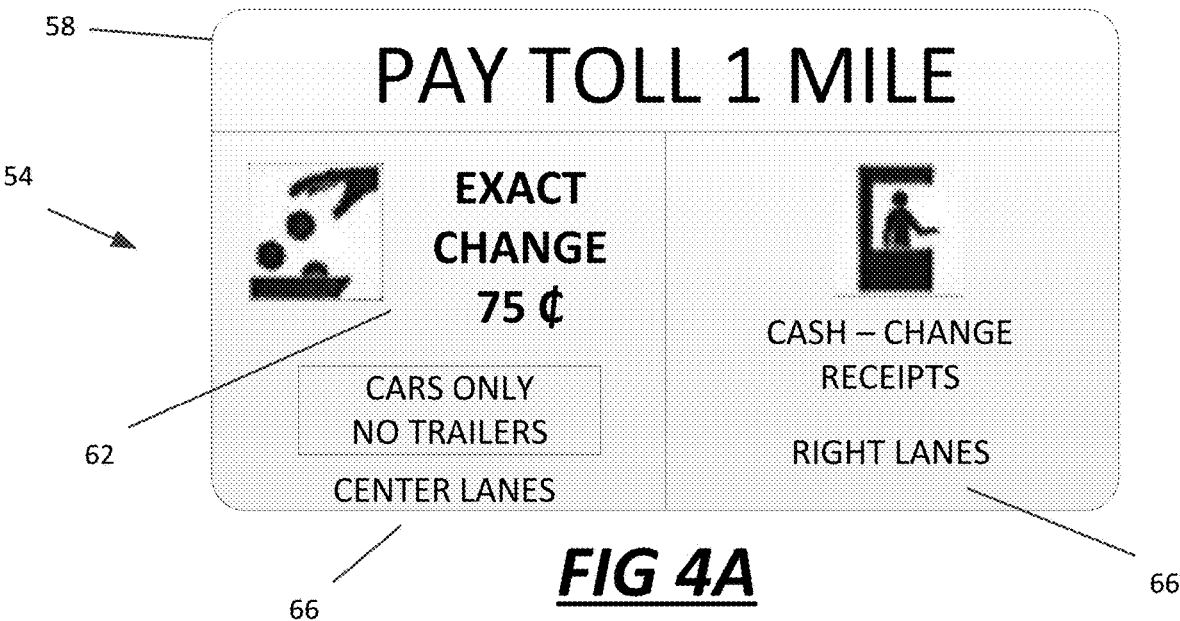
FIGS. 4A-4D illustrate example traffic signs according to the present disclosure.

Example toll signs are provided in FIGS. 4A-4D. Illustrated are four different examples of toll signs. A first sign 54 is illustrated in FIG. 4A. In the first sign 54, a toll booth location 58, a toll cost 62, and lane information 66 are provided. Additionally, the first sign 54 includes images or symbols to indicate the information pictorially. For example, each of the location, cost, and lane information may be detected using data recognition and image comparison.

Figure 4B:

A second sign 70 is illustrated in FIG. 4B. In the second sign 70, only a toll road name 74 may be provided. For example, the toll road name 74 may be in English or another language, such as Japanese, or any other language, and may be detected using data recognition and image comparison.

Figure 4C:
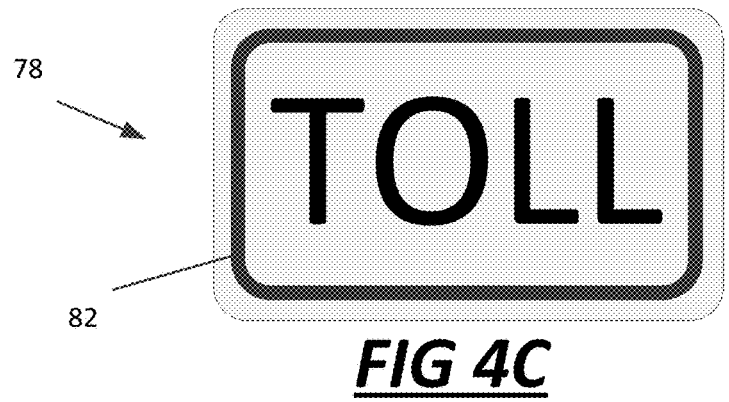

A third sign 78 is illustrated in FIG. 4C. In the third sign 78, only a "TOLL" indicator 82 may be provided. For example, the "TOLL" indicator 82 may be in English or another language and may be detected using data recognition and image comparison.

Figure 4D:
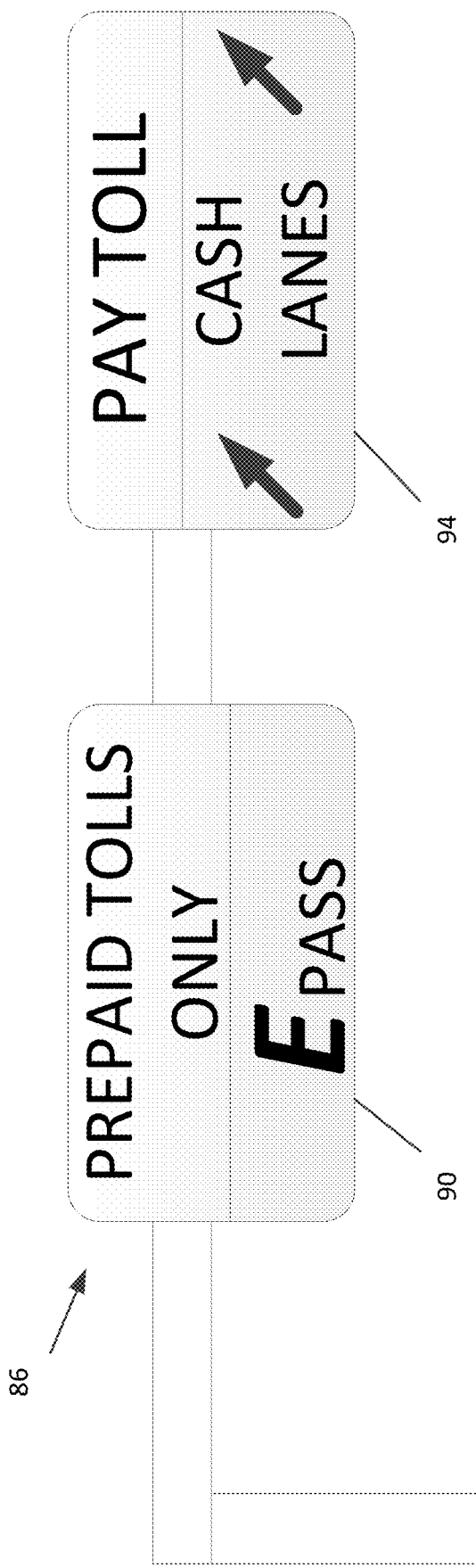

An example lane display 86 is provided in FIG. 4D. The lane display 86 includes a sign for prepaid tolls 90 and a sign for cash tolls 94. Each of the signs indicate the correct lane for the respective payment method. For example, the content on the signs 90, 94 may be detected using data recognition and image comparison.

Referring back to FIG. 2, the sign recognition unit 38 may utilize an internet connection 98. For example, in cases where the sign does not provide toll information (for example, FIGS. 4B-4D) and an internet (or Wi-Fi) connection is available, the sign recognition unit 38 may search for toll information on the internet 98. For example, if the toll name is available (i.e., the toll name is listed on the sign and detected using data recognition), the sign recognition unit 38 may search for the toll price using the toll name. If the toll name is not available (for example, FIGS. 4C-4D), the sign recognition unit 38 may communicate with the vehicle position determination unit 34 and search the vehicle's current position on the internet 98 to determine the nearest toll booth, toll name, and/or toll price. In some embodiments, the sign recognition unit 38 may obtain the vehicle odometer reading to determine the current vehicle location. The vehicle odometer reading can be used to determine the distance driven on a particular road or distance-based tollway.

The sign recognition unit 38 may communicate with the memory 42. In cases where the sign does not provide toll information (for example, FIGS. 4B-4D) and an internet (or Wi-Fi) connection is not available, the sign recognition unit 38 may be able to gather toll information from stored data in the memory 42. For example, if the vehicle 10 has traveled the current road previously, the toll information may be stored in the memory 42. In these cases, the sign recognition unit 38 can pull the toll information for the exact toll booth in the vehicle's current position.

The sign recognition unit 38 may communicate the toll information to the communication unit 46. The communication unit 46 may package the toll information for communication to the Driver Alert System 22. For example only, the communication unit 46 may filter the data from the sign recognition unit 38 and communicate only the data that is intended for driver notification to the driver alert system 22.

The driver alert system 22 may notify the driver of the toll distance, toll cost, and/or lane information. For example, the notification may be a visual notification or an audible notification that is provided through the Head-Up Display (HUD) of the vehicle or through the vehicle's speakers.

Figure 3:
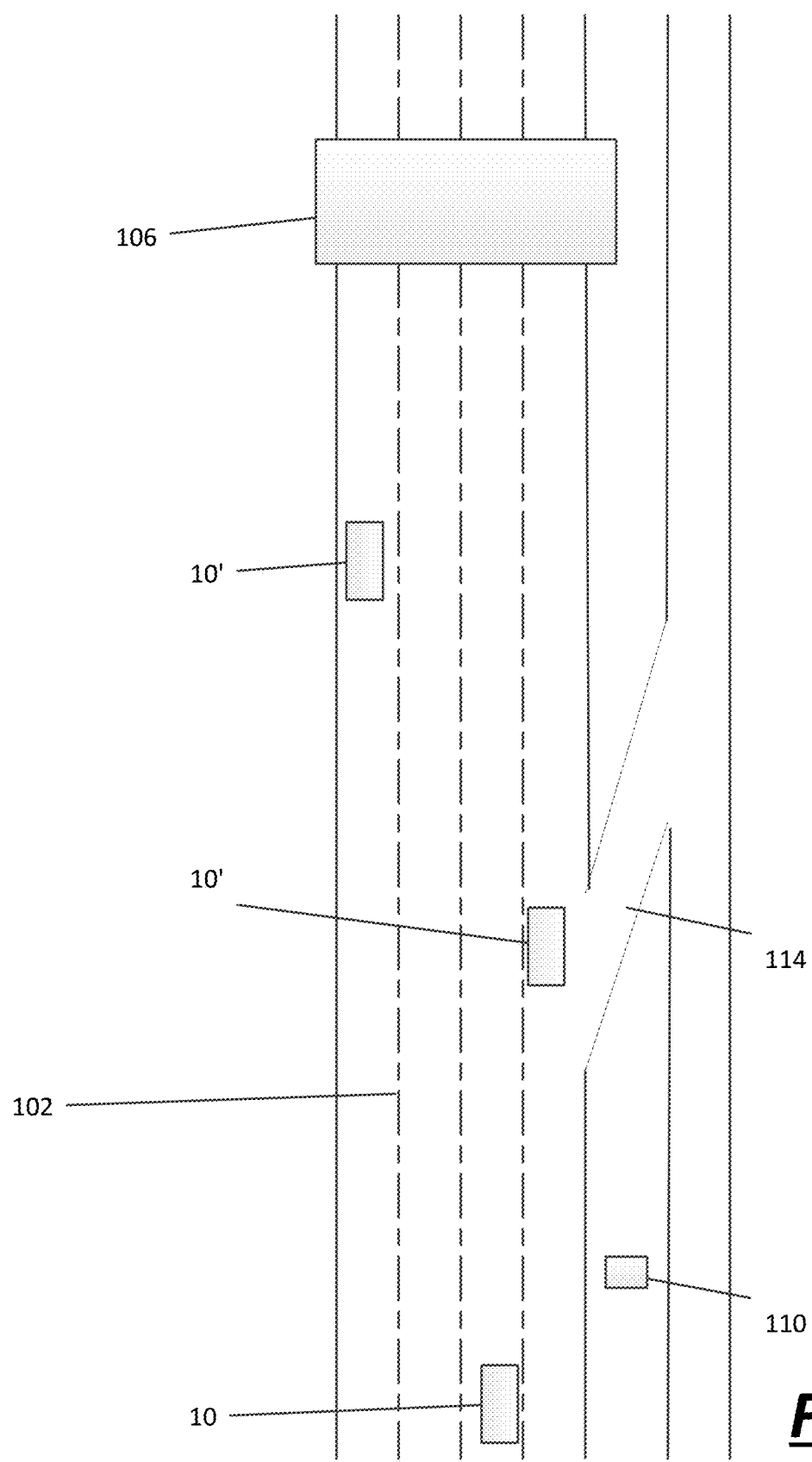
FIG. 3 illustrates a traffic scenario involving the vehicle of FIG. 1.

Now referring to FIG. 3, an example scenario is illustrated. The host vehicle 10 and a plurality of remote vehicles 10' are shown travelling on a toll road 102. The toll booth is illustrated at 106 and a toll sign(s) is illustrated at 110. While the disclosed system 14 is best utilized where the toll sign(s) 110 is located prior to an exit ramp 114, as illustrated, the system 14 will provide the toll information regardless of where the sign(s) 110 are positioned.

As the vehicle 10 is travelling along the toll road 102, the cameras 18 and controller 26 are continuously monitoring the vehicle environment to detect toll sign(s) 110 (for example only, FIGS. 4A-4D). Upon detection of a toll sign 110, the controller 26 (for example, the sign recognition unit 38) either deciphers the toll information from the toll sign 110 (for example, using data recognition and/or image comparison), utilizes the vehicle position and/or existing sign data to search for the toll information using the internet 98, or utilizes the vehicle position and/or existing sign data to select the toll data from memory 42. The controller 26 (for example, the communication unit 46) transmits the data to the driver alert system 22, and the driver alert system 22 notifies the driver of the toll cost, distance to the toll booth, and/or lane information. With knowledge of the toll information, the driver can position the vehicle in the correct lane, or exit the toll road completely.

Figure 5:
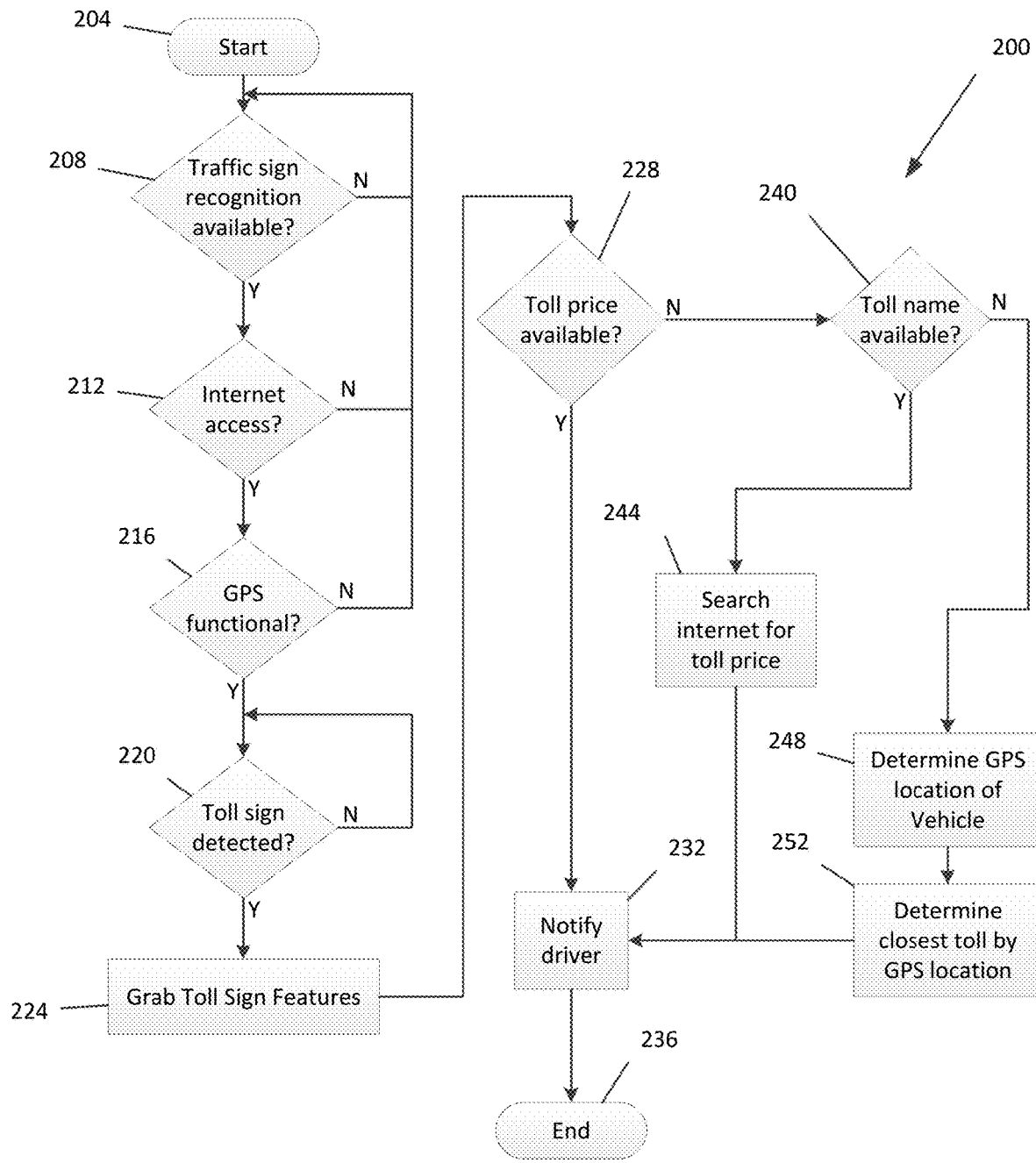
FIG. 5 is a flow chart of an example method for detecting and reporting toll roads according to the present disclosure.

Now referring to FIG. 5, an example method for detecting and reporting toll roads 200 is illustrated. Method 200 starts at 204. At 208, the method 200 determines whether traffic sign recognition is available. For example, the controller 26 determines whether the cameras 18 are operating correctly and determines whether the data recognition and/or image comparison systems are properly functioning and enabled. If the traffic sign recognition is not available, the method 200 returns to 204.

If traffic sign recognition is available at 208, method 200 determines whether there is internet (or Wi-Fi) access at 212. For example, the controller 26 tests its connection with the internet 98. If there is no internet access, method 200 returns to 204.

If there is internet access at 212, method 200 determines whether the GPS is functional at 216. For example, the controller 26 tests its connection with the GPS/GNSS at 30. If the GPS is not functional, method 200 returns to 204.

If the GPS is functional at 216, the method 200 determines whether a toll sign is detected at 220. For example, the controller 26 (and sign recognition unit 38) monitors the images of the vehicle environment that are continuously taken by the cameras 18 to detect a toll sign. The controller 26 may use traffic sign recognition, data recognition, and/or image comparison to detect toll signs. If a toll sign is not detected, method 200 returns to 220.

If a toll sign is detected at 220, the toll sign features are determined at 224. For example, the sign recognition unit 38 may determine toll information, such as toll booth location, toll cost, and/or lane information, from the images using data recognition. In the example, the sign recognition unit 38 may use data recognition or compare known toll images, words, or letters to detect and decipher the information provided in the images from the cameras 18.

At 228, the method 200 determines if a toll price is available. For example, the toll price may be detected and deciphered using data recognition or image comparison from the camera image. If the toll price is available, the driver is notified at 232. For example, the driver alert system 22 may notify the driver of the toll distance, toll cost, and/or lane information. The notification may be a visual notification or an audible notification that is provided through the Head-Up Display (HUD) of the vehicle or through the vehicle's speakers. The method 200 then ends at 236.

If the toll price is not available at 228, the method 200 determines whether the toll name is available at 240. For example, the toll name may be detected and deciphered using data recognition or image comparison from the camera image. If the toll name is available, the method 200 may search the internet to determine a toll price for the toll name at 244. For example, the sign recognition unit 38 may search the internet 98 using the toll name to determine the toll price. The driver may then be notified at 232 and the method 200 ends at 236.

If the toll name is not available at 240, the GPS location of the vehicle 10 may be determined at 248. For example, the vehicle position determination unit 34 may communicate with, and receive signals from, the GPS and/or GNSS 30 to determine the location of the vehicle 10.

The closest toll booth location may be determined at 252. For example, the sign recognition unit 38 may communicate with the vehicle position determination unit 34 and search the vehicle's current position on the internet 98 to determine the nearest toll booth, toll name, and/or toll price. In some embodiments, the sign recognition unit 38 may obtain the vehicle odometer reading to determine the current vehicle location. The vehicle odometer reading can be used to determine the distance driven on a particular road or distance-based tollway. The driver is then notified at 232 and the method 200 ends at 236.

Figure 6:
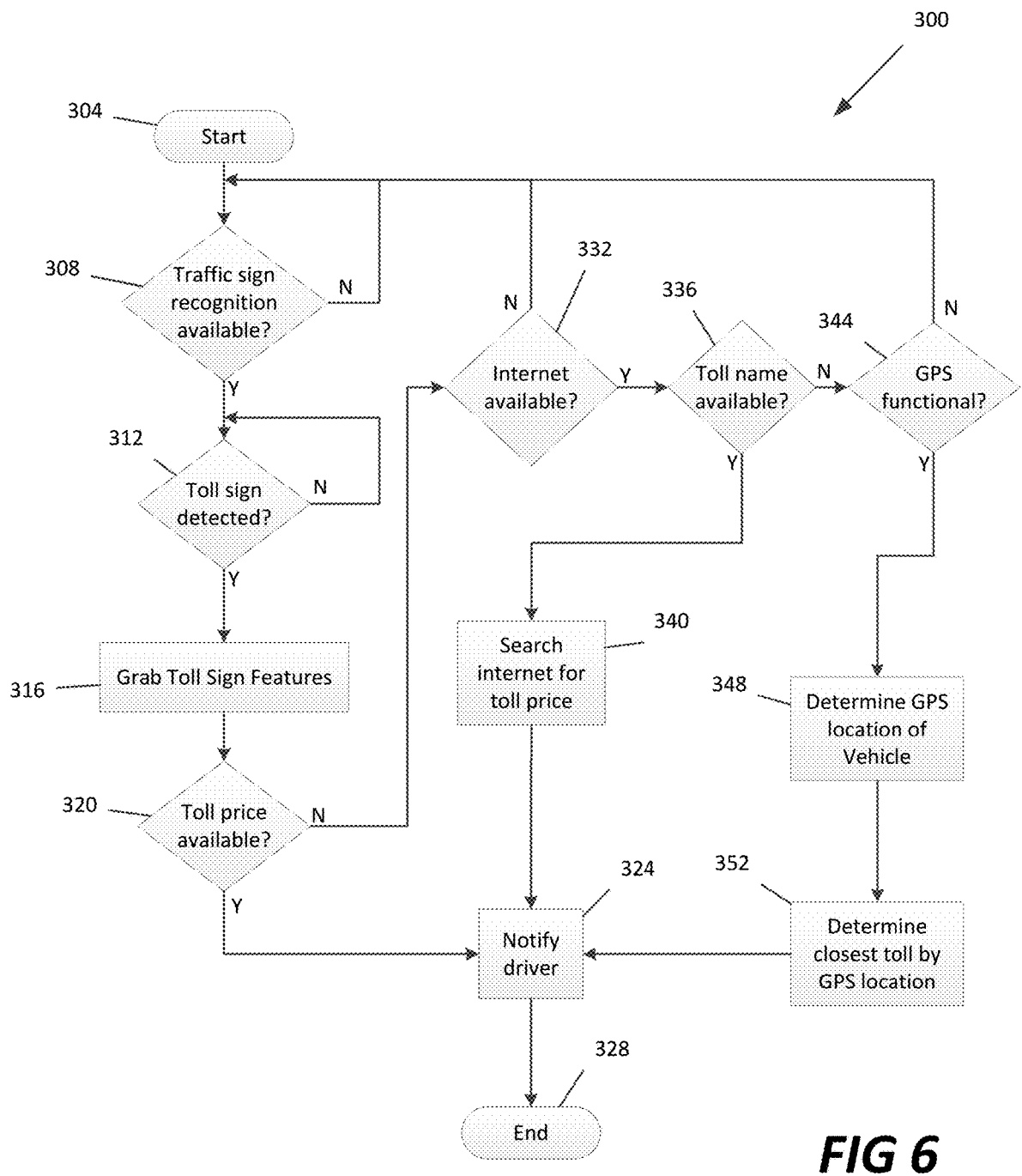
FIG. 6 is a flow chart of another example method for detecting and reporting toll roads according to the present disclosure.

Now referring to FIG. 6, another example method for detecting and reporting toll roads 300 is illustrated. Method 300 starts at 304. At 308, the method 300 determines whether traffic sign recognition is available. For example, the controller 26 determines whether the cameras 18 are operating correctly and determines whether the data recognition and/or image comparison systems are properly functioning and enabled. If the traffic sign recognition is not available, the method 300 returns to 304.

If traffic sign recognition is available at 308, the method 300 determines whether a toll sign is detected at 312. For example, the controller 26 (and sign recognition unit 38) monitors the images of the vehicle environment that are continuously taken by the cameras 18 to detect a toll sign. The controller 26 may use traffic sign recognition, data recognition, and/or image comparison to detect toll signs. If a toll sign is not detected, method 300 returns to 312.

If a toll sign is detected at 312, the toll sign features are determined at 316. For example, the sign recognition unit 38 may determine toll information, such as toll booth location, toll cost, and/or lane information, from the images using data recognition. In the example, the sign recognition unit 38 may use data recognition or compare known toll images, words, or letters to detect and decipher the information provided in the images from the cameras 18.

At 320, the method 300 determines if a toll price is available. For example, the image of the toll sign is captured using the cameras 18, and the toll price may be detected and deciphered using data recognition or image comparison. If the toll price is available, the driver is notified at 324. For example, the driver alert system 22 may notify the driver of the toll distance, toll cost, and/or lane information. The notification may be a visual notification or an audible notification that is provided through the Head-Up Display (HUD) of the vehicle or through the vehicle's speakers. The method 300 then ends at 328.

If the toll price is not available at 320, the method 300 determines whether there is internet (or Wi-Fi) access at 332. For example, the controller 26 tests its connection with the internet 98. If there is no internet access, method 300 returns to 308.

If there is internet access at 332, the method 300 determines whether the toll name is available at 336. For example, the toll name may be detected and deciphered using data recognition or image comparison from the camera image. If the toll name is available, the method 300 may search the internet to determine a toll price for the toll name at 340. For example, the sign recognition unit 38 may search the internet 98 using the toll name to determine the toll price. The driver may then be notified at 324 and the method 300 ends at 328.

If the toll name is not available at 336, method 300 determines whether the GPS is functional at 344. For example, the controller 26 tests its connection with the GPS/GNSS at 30. If the GPS is not functional, method 300 returns to 308.

If the GPS is functional at 344, the GPS location of the vehicle 10 may be determined at 348. For example, the vehicle position determination unit 34 may communicate with, and receive signals from, the GPS and/or GNSS 30 to determine the location of the vehicle 10.

The closest toll booth location may be determined at 352. For example, the sign recognition unit 38 may communicate with the vehicle position determination unit 34 and search the vehicle's current position on the internet 98 to determine the nearest toll booth, toll name, and/or toll price. In some embodiments, the sign recognition unit 38 may obtain the vehicle odometer reading to determine the current vehicle location. The vehicle odometer reading can be used to determine the distance driven on a particular road or distance-based tollway. The driver is then notified at 324 and the method 300 ends at 328.

Figure 7:
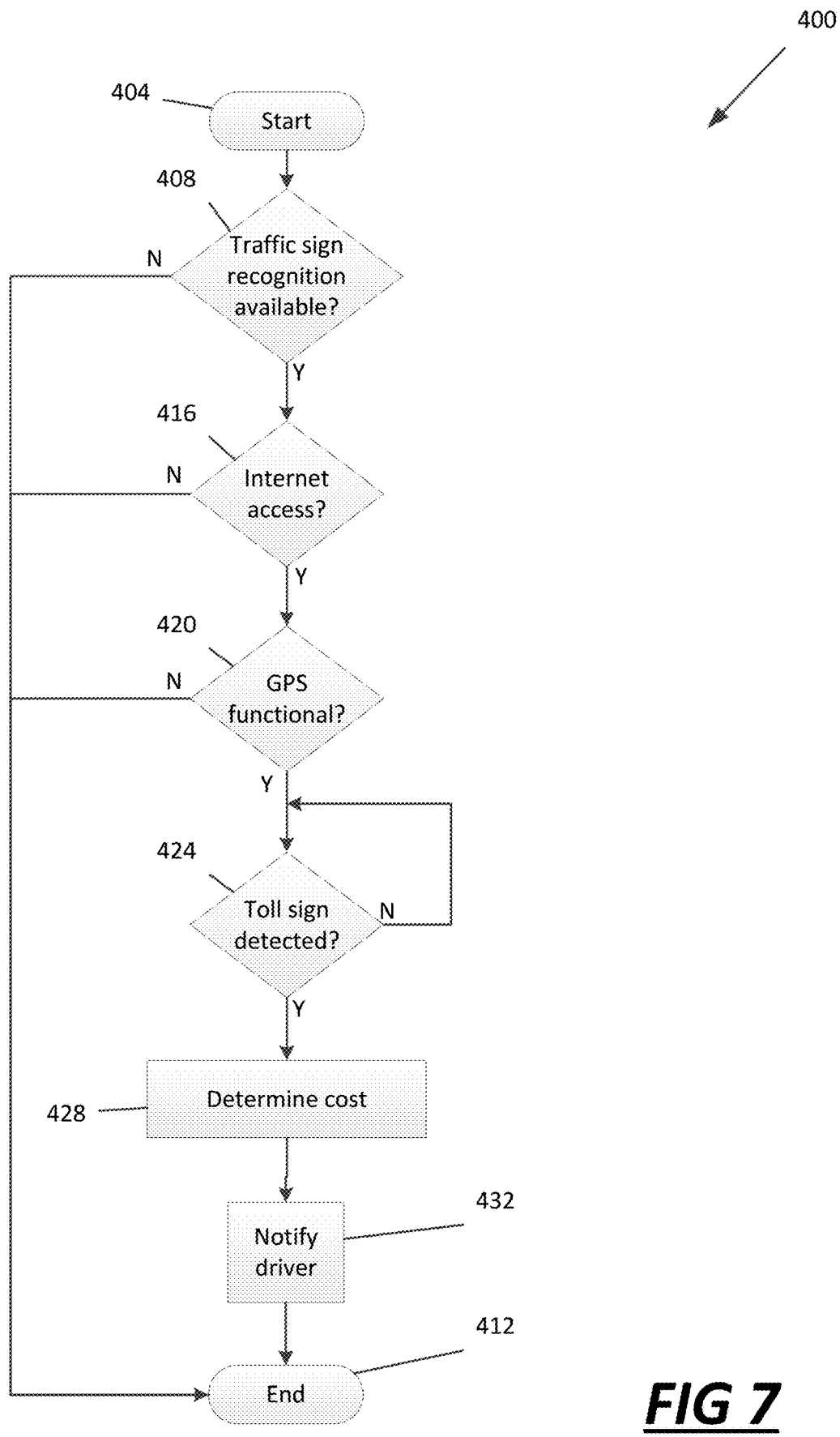
FIG. 7 is a flow chart of another example method for detecting and reporting toll roads according to the present disclosure.

Now referring to FIG. 7, another example method for detecting and reporting toll roads 400 is illustrated. Method 400 may be an example method that is followed in a normal case where the system 14 can determine cost from traffic sign recognition. For example, the toll sign may be similar to the sign in FIG. 4A or may contain similar content.

Method 400 starts at 404. At 408, the method 400 determines whether traffic sign recognition is available. For example, the controller 26 determines whether the cameras 18 are operating correctly and determines whether the data recognition and/or image comparison systems are properly functioning and enabled. If the traffic sign recognition is not available, the method 400 ends at 412.

If traffic sign recognition is available at 408, method 400 determines whether there is internet (or Wi-Fi) access at 416. For example, the controller 26 tests its connection with the internet 98. If there is no internet access, method 400 ends at 412.

If there is internet access at 416, method 400 determines whether the GPS is functional at 420. For example, the controller 26 tests its connection with the GPS/GNSS at 30. If the GPS is not functional, method 400 ends at 412.

If the GPS is functional at 420, the method 400 determines whether a toll sign is detected at 424. For example, the controller 26 (and sign recognition unit 38) monitors the images of the vehicle environment that are continuously taken by the cameras 18 to detect a toll sign. The controller 26 may use traffic sign recognition, data recognition, and/or image comparison to detect toll signs. If a toll sign is not detected, method 400 returns to 424.

If a toll sign is detected at 424, the cost of the toll is determined at 428. For example, the sign recognition unit 38 may determine the toll cost from the images using data recognition. In the example, the sign recognition unit 38 may use data recognition or compare known toll images, words, or letters to detect and decipher the information provided in the images from the cameras 18.

At 432, the driver is notified of the toll cost. For example, the driver alert system 22 may notify the driver using a visual notification or an audible notification that is provided through the Head-Up Display (HUD) of the vehicle or through the vehicle's speakers. The method 400 then ends at 412.

Figure 8:
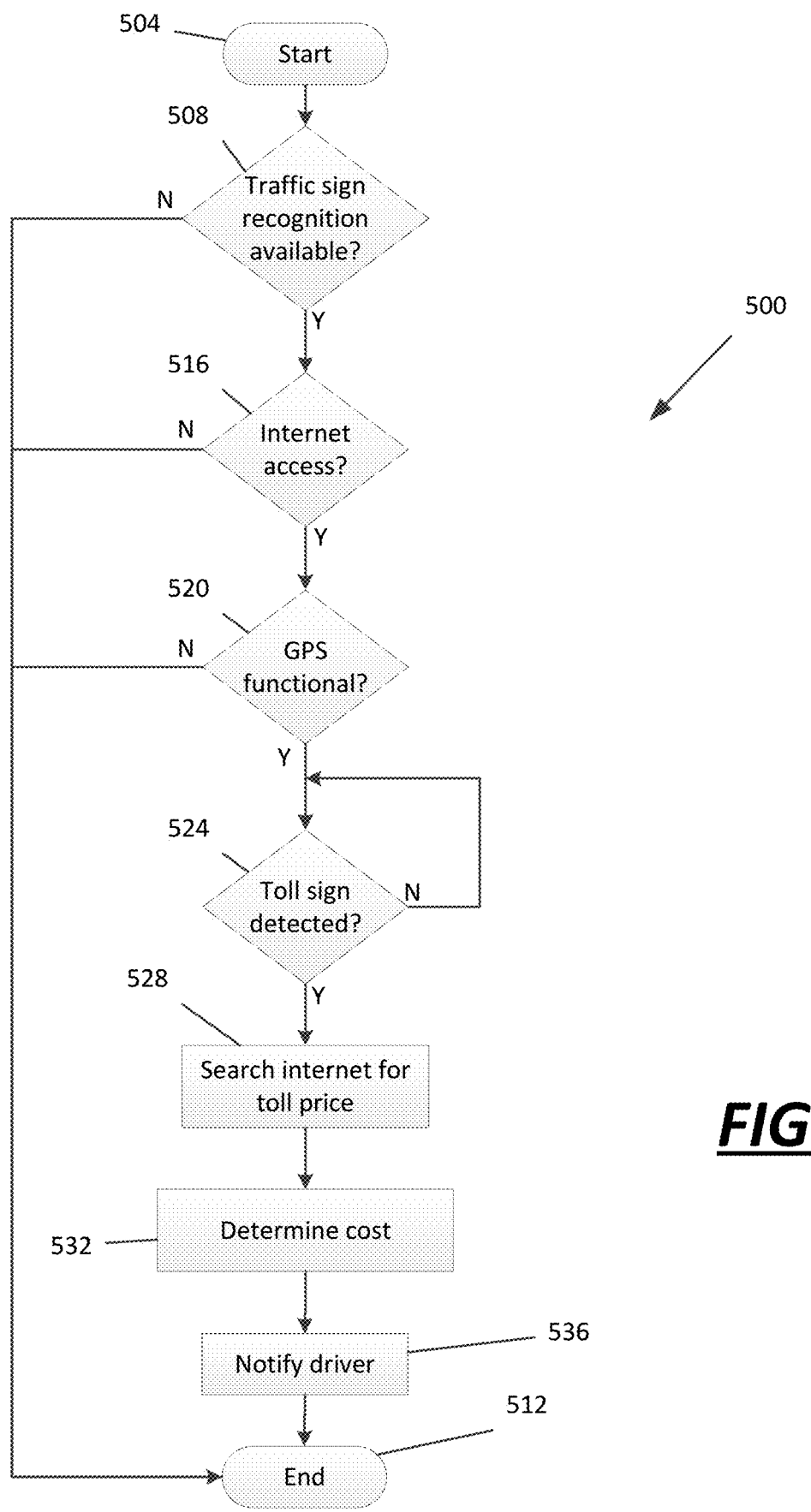
FIG. 8 is a flow chart of another example method for detecting and reporting toll roads according to the present disclosure.

Now referring to FIG. 8, another example method for detecting and reporting toll roads 500 is illustrated. Method 500 may be an example method that is followed in a severe case where the system 14 can determine the location but not the cost from traffic sign recognition. For example, the toll sign may be similar to the sign in FIG. 4B or may contain similar content.

Method 500 starts at 504. At 508, the method 500 determines whether traffic sign recognition is available. For example, the controller 26 determines whether the cameras 18 are operating correctly and determines whether the data recognition and/or image comparison systems are properly functioning and enabled. If the traffic sign recognition is not available, the method 500 ends at 512.

If traffic sign recognition is available at 508, method 500 determines whether there is internet (or Wi-Fi) access at 516. For example, the controller 26 tests its connection with the internet 98. If there is no internet access, method 500 ends at 512.

If there is internet access at 516, method 500 determines whether the GPS is functional at 520. For example, the controller 26 tests its connection with the GPS/GNSS at 30. If the GPS is not functional, method 500 ends at 512.

If the GPS is functional at 520, the method 500 determines whether a toll sign is detected at 524. For example, the controller 26 (and sign recognition unit 38) monitors the images of the vehicle environment that are continuously taken by the cameras 18 to detect a toll sign. The controller 26 may use traffic sign recognition, data recognition, and/or image comparison to detect toll signs. If a toll sign is not detected, method 500 returns to 524.

If a toll sign is detected at 524, the method 500 may search the internet 98 to determine a toll price at 528. For example, the sign recognition unit 38 may search the internet 98 using the toll location to determine the toll price. The toll location may be determined from the toll name or the current location of the vehicle, as described previously.

At 532, the method 500 determines the toll cost. The driver is notified at 536. For example, the driver alert system 22 may notify the driver of the toll cost. The notification may be a visual notification or an audible notification that is provided through the Head-Up Display (HUD) of the vehicle or through the vehicle's speakers. The method 500 then ends at 512.

Figure 9:
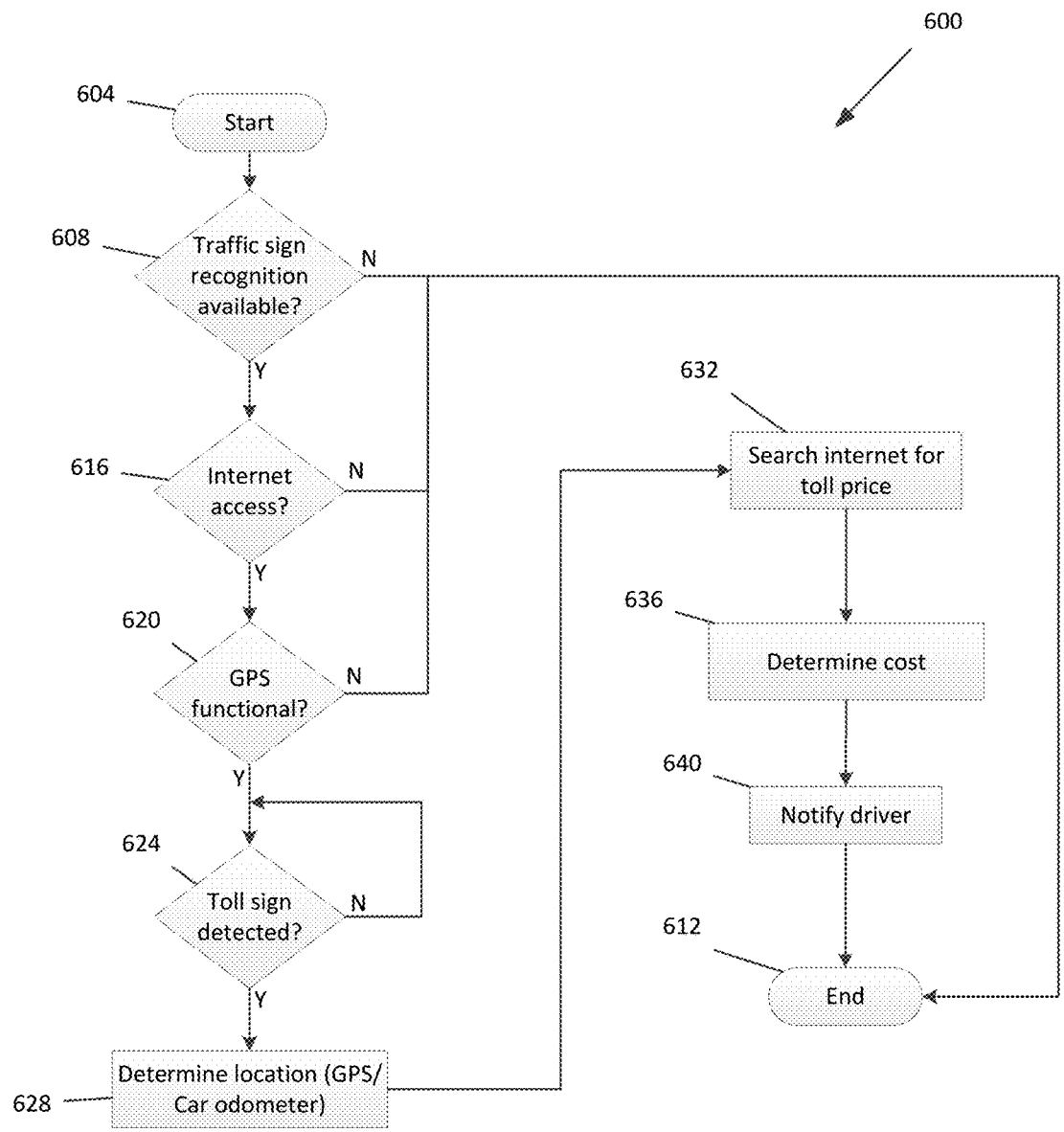
FIG. 9 is a flow chart of another example method for detecting and reporting toll roads according to the present disclosure.

Now referring to FIG. 9, another example method for detecting and reporting toll roads 600 is illustrated. Method 600 may be an example method that is followed in an extreme case where the system 14 cannot determine the toll location or the cost from traffic sign recognition. For example, the toll sign may be similar to the sign in FIG. 4C or may contain similar content.

Method 600 starts at 604. At 608, the method 600 determines whether traffic sign recognition is available. For example, the controller 26 determines whether the cameras 18 are operating correctly and determines whether the data recognition and/or image comparison systems are properly functioning and enabled. If the traffic sign recognition is not available, the method 600 ends at 612.

If traffic sign recognition is available at 608, method 600 determines whether there is internet (or Wi-Fi) access at 616. For example, the controller 26 tests its connection with the internet 98. If there is no internet access, method 600 ends at 612.

If there is internet access at 616, method 600 determines whether the GPS is functional at 620. For example, the controller 26 tests its connection with the GPS/GNSS at 30. If the GPS is not functional, method 600 ends at 612.

If the GPS is functional at 620, the method 600 determines whether a toll sign is detected at 624. For example, the controller 26 (and sign recognition unit 38) monitors the images of the vehicle environment that are continuously taken by the cameras 18 to detect a toll sign. The controller 26 may use traffic sign recognition, data recognition, and/or image comparison to detect toll signs. If a toll sign is not detected, method 600 returns to 624.

If a toll sign is detected at 624, the GPS location of the toll booth may be determined at 628. Initially, the GPS location of the vehicle 10 may be determined. For example, the vehicle position determination unit 34 may communicate with, and receive signals from, the GPS and/or GNSS 30 to determine the location of the vehicle 10. The closest toll booth location may be determined from the current vehicle location. For example, the sign recognition unit 38 may communicate with the vehicle position determination unit 34 and search the vehicle's current position on the internet 98 to determine the nearest toll booth, toll name, and/or toll price. In some embodiments, the sign recognition unit 38 may obtain the vehicle odometer reading to determine the current vehicle location. The vehicle odometer reading can be used to determine the distance driven on a particular road or distance-based tollway.

At 636, the toll cost is determined. For example, the sign recognition unit 38 may search the internet 98 using the toll location to determine the toll price.

At 640, the driver is notified of the cost. For example, the driver alert system 22 may notify the driver of the toll cost through a visual notification or an audible notification that is provided through the Head-Up Display (HUD) of the vehicle or through the vehicle's speakers. The method 600 then ends at 612.

Figure 10:
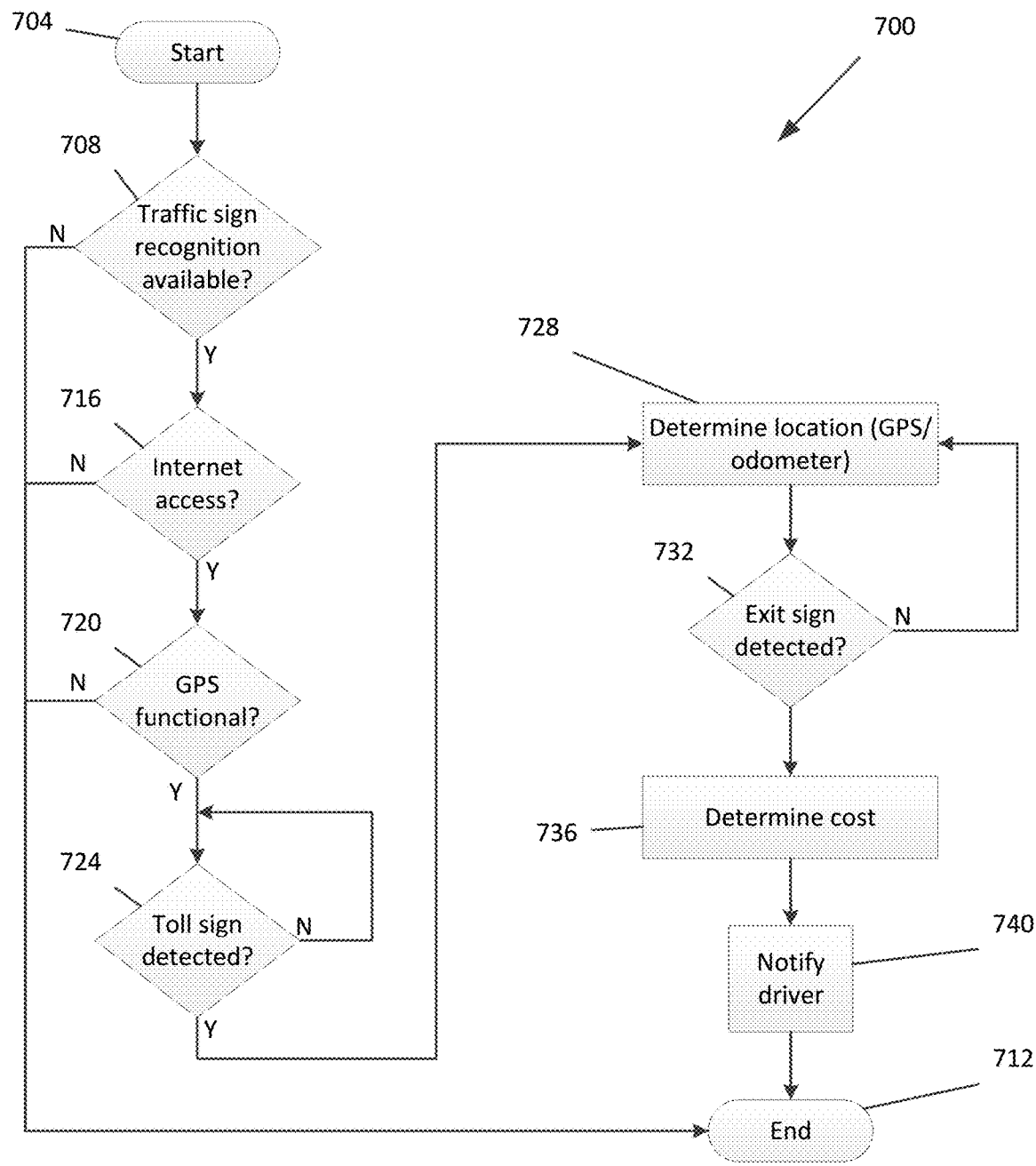
FIG. 10 is a flow chart of another example method for detecting and reporting toll roads according to the present disclosure.

Now referring to FIG. 10, another example method for detecting and reporting toll roads 700 is illustrated. Method 700 may be an example method that is followed for distance-based toll roads. A distance-based toll road is a toll road that charges drivers based on the distance driven from the entrance gate of the toll road. For example, the fee for the toll road may be variable and based on vehicle type and distance.

Method 700 starts at 704. At 708, the method 700 determines whether traffic sign recognition is available. For example, the controller 26 determines whether the cameras 18 are operating correctly and determines whether the data recognition and/or image comparison systems are properly functioning and enabled. If the traffic sign recognition is not available, the method 700 ends at 712.

If traffic sign recognition is available at 708, method 700 determines whether there is internet (or Wi-Fi) access at 716. For example, the controller 26 tests its connection with the internet 98. If there is no internet access, method 700 ends at 712.

If there is internet access at 716, method 700 determines whether the GPS is functional at 720. For example, the controller 26 tests its connection with the GPS/GNSS at 30. If the GPS is not functional, method 700 ends at 712.

If the GPS is functional at 720, the method 700 determines whether a toll sign is detected at 724. For example, the controller 26 (and sign recognition unit 38) monitors the images of the vehicle environment that are continuously taken by the cameras 18 to detect a toll sign. The controller 26 may use traffic sign recognition, data recognition, and/or image comparison to detect toll signs. If a toll sign is not detected, method 700 returns to 724.

If a toll sign is detected at 724, the location of the vehicle 10 may be determined at 728. For example, the vehicle position determination unit 34 may communicate with, and receive signals from, the GPS and/or GNSS 30 to determine the GPS location of the vehicle 10. In other embodiments, the sign recognition unit 38 may obtain the vehicle odometer reading to determine the current vehicle location. The vehicle odometer reading can be used to determine the distance driven on a particular road or distance-based tollway.

At 732, the method 700 attempts to detect an exit sign. For example, the controller 26 (and sign recognition unit 38) monitors the images of the vehicle environment that are continuously taken by the cameras 18 to detect an exit sign. The controller 26 may use traffic sign recognition, data recognition, and/or image comparison to detect exit signs. If an exit sign is not detected, method 700 returns to 728.

If an exit sign is detected at 732, the cost is determined at 736. As previously stated, a distance-based toll road is a toll road that charges drivers based on the distance driven from the entrance gate of the toll road. For example, the fee for the toll road may be variable and based on vehicle type and distance. As such, the controller 26 (and sign recognition unit 38) may use the location and vehicle type to calculate the cost.

The driver is notified at 740. For example, the driver alert system 22 may notify the driver of the toll distance, toll cost, and/or lane information. The notification may be a visual notification or an audible notification that is provided through the Head-Up Display (HUD) of the vehicle or through the vehicle's speakers. The method 700 then ends at 712.

Figure 11:
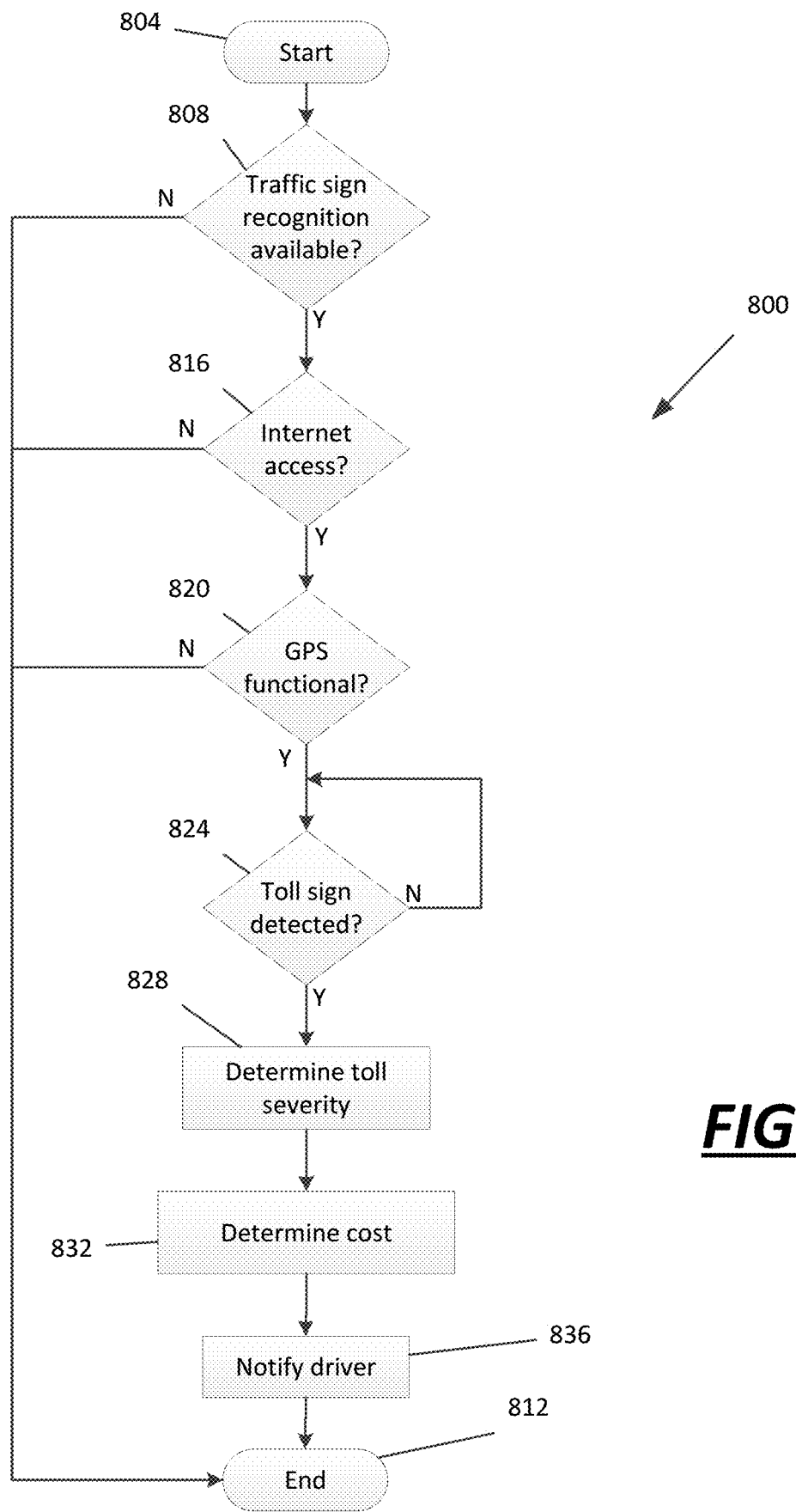
FIG. 11 is a flow chart of another example method for detecting and reporting toll roads according to the present disclosure.

Now referring to FIG. 11, another example method for detecting and reporting toll roads 800 is illustrated. Method 800 may be an example method that is followed for online-pay toll roads. An online-pay toll road is a toll road without booths where drivers are required to pay the toll fee online. In some embodiments, these tolls may also be distance-based.

Method 800 starts at 804. At 808, the method 800 determines whether traffic sign recognition is available. For example, the controller 26 determines whether the cameras 18 are operating correctly and determines whether the data recognition and/or image comparison systems are properly functioning and enabled. If the traffic sign recognition is not available, the method 800 ends at 812.

If traffic sign recognition is available at 808, method 800 determines whether there is internet (or Wi-Fi) access at 816. For example, the controller 26 tests its connection with the internet 98. If there is no internet access, method 800 ends at 812.

If there is internet access at 816, method 800 determines whether the GPS is functional at 820. For example, the controller 26 tests its connection with the GPS/GNSS at 30. If the GPS is not functional, method 800 ends at 812.

If the GPS is functional at 820, the method 800 determines whether a toll sign is detected at 824. For example, the controller 26 (and sign recognition unit 38) monitors the images of the vehicle environment that are continuously taken by the cameras 18 to detect a toll sign. The controller 26 may use traffic sign recognition, data recognition, and/or image comparison to detect toll signs. If a toll sign is not detected, method 800 returns to 824.

If a toll sign is detected at 824, the toll severity is determined at 828. The toll severity may be normal, severe, or extreme, as described in FIGS. 7-9 (and the associated detailed description). A normal toll severity may be applied when the toll can be determined using traffic sign recognition. A severe severity may be applied when the location, but not the price, can be determined using traffic sign recognition. An extreme severity may be applied when the toll location and cost cannot be determined using traffic sign recognition. For example, the severity may be determined by detecting information on the toll sign using traffic sign recognition (for example, data recognition or image comparison).

At 832 the cost is determined. The cost may be determined through sign recognition (normal case), searching cost using the toll name and/or location (severe case), or determining the toll location by determining the vehicle location and searching cost using the toll location (extreme case). In distance-based embodiments, the cost may be determined as described in steps 728-736 of method 700 (FIG. 10).

The driver is notified at 836. For example, the driver alert system 22 may notify the driver of the toll distance, toll cost, and/or lane information. The notification may be a visual notification or an audible notification that is provided through the Head-Up Display (HUD) of the vehicle or through the vehicle's speakers. The method 800 then ends at 812.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Spatial and functional relationships between elements (for example, between modules, circuit elements, semiconductor layers, units, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module," the term "unit," or the term "controller" may be replaced with the term "circuit." The term "module" or the term "unit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module or unit may include one or more interface circuits. In some examples, the interface circuits may include wired or wireless interfaces that are connected to a local area network (LAN), the Internet, a wide area network (WAN), or combinations thereof. The functionality of any given module or unit of the present disclosure may be distributed among multiple modules or units that are connected via interface circuits. For example, multiple modules or units may allow load balancing. In a further example, a server (also known as remote, or cloud) module or unit may accomplish some functionality on behalf of a client module or unit.

The term code, as used above, may include software, firmware, and/or microcode, and may refer to programs, routines, functions, classes, data structures, and/or objects. The term shared processor circuit encompasses a single processor circuit that executes some or all code from multiple modules or units. The term group processor circuit encompasses a processor circuit that, in combination with additional processor circuits, executes some or all code from one or more modules or units. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules or units. The term group memory circuit encompasses a memory circuit that, in combination with additional memories, stores some or all code from one or more modules or units.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A toll road detection and notification system for a vehicle comprising:
    a plurality of cameras configured to take images of a vehicle's environment;
    a sign recognition unit configured to analyze the images from the plurality of cameras, detect a toll sign, and determine toll information; and
    a driver alert system configured to receive toll information from the sign recognition unit and notify a driver of the vehicle of the toll information.

2. The system of claim 1, wherein the sign recognition unit is configured to use data recognition or image comparison to detect a toll cost from images or words printed on the toll sign.

3. The system of claim 1, further comprising a vehicle position determination unit configured to determine a location of the vehicle, wherein the sign recognition unit is configured to receive the location of the vehicle and determine a toll booth location, and the sign recognition unit is configured to search the internet to determine a toll cost from the toll booth location.

4. The system of claim 3, wherein the vehicle position determination unit is configured to determine the location of the vehicle by communicating with a global positioning system.

5. The system of claim 3, wherein the vehicle position determination unit is configured to determine the location of the vehicle using an odometer reading.

6. The system of claim 1, wherein the sign recognition unit is configured to use data recognition or image comparison to detect a toll booth location from images or words printed on the toll sign, and is configured to search the internet to determine a toll cost from the toll booth location.

7. The system of claim 1, wherein the driver alert system is configured to notify the driver using an audible alert through at least one speaker on the vehicle.

8. The system of claim 1, wherein the driver alert system is configured to notify the driver using a visual alert on a heads-up display on the vehicle.

9. The system of claim 1, wherein the sign recognition unit is configured to detect lane information using data recognition or image comparison from images or words on the toll sign and the driver alert system is configured to notify the driver of the lane information.

10. A method of detecting and reporting a toll road comprising:
    capturing, by a plurality of cameras, at least one image of an environment of a vehicle on which the plurality of cameras are mounted;
    analyzing, by a sign recognition unit, the at least one image from the plurality of cameras;
    detecting, by the sign recognition unit, a toll sign from the at least one image;
    determining, by the sign recognition unit, toll information;
    receiving, by a driver alert system, toll information from the sign recognition unit; and
    notifying, by the driver alert system, a driver of the vehicle of the toll information.

11. The method of claim 10, further comprising detecting, by the sign recognition unit, a toll cost from images or words printed on the toll sign using data recognition or image comparison.

12. The method of claim 10, further comprising:
    determining, by a vehicle position determination unit, a location of the vehicle;
    receiving, by the sign recognition unit, the location of the vehicle;
    determining, by the sign recognition unit, a toll booth location from the location of the vehicle; and
    searching, by the sign recognition unit, the internet to determine a toll cost from the toll booth location.

13. The method of claim 12, further comprising communicating, by the vehicle position determination unit, with a global positioning system to determine the location of the vehicle.

14. The method of claim 12, further comprising determining, by the vehicle position determination unit, the location of the vehicle using an odometer reading.

15. The method of claim 10, further comprising:
    implementing, by the sign recognition unit, data recognition or image comparison to detect a toll booth location from images or words printed on the toll sign; and
    searching, by the sign recognition unit, the internet to determine a toll cost from the toll booth location.

16. The method of claim 10, further comprising sending, by the driver alert system, an audible alert through at least one speaker on the vehicle to notify the driver.

17. The method of claim 10, further comprising sending, by the driver alert system, a visual alert on a heads-up display on the vehicle to notify the driver.

18. The method of claim 10, further comprising detecting, by the sign recognition unit, lane information using data recognition or image comparison from images or words on the toll sign; and
    notifying, by the driver alert system, the driver of the lane information.

* * * * *